( 12 ) United States Patent
Ten

(10) Patent No.: US 10,612,111 B2
(45) Date of Patent: Apr. 7, 2020

(54) METHOD AND APPARATUS FOR EXTRACTING HIGH-PURITY GOLD FROM ORE

(71) Applicants: Robert Ten, Almaty (KZ); Elena Makhnitskaya, Astana (KZ)

(72) Inventor: Robert Ten, Almaty (KZ)

( * ) Notice: Subject to any disclaimer, the term of this patent is extended or adjusted under 35 U.S.C. 154(b) by 0 days.

(21) Appl. No.: 16/108,076

(22) Filed: Aug. 21, 2018

(65) Prior Publication Data

US 2020/0063237 A1 Feb. 27, 2020

(51) Int. Cl.
| | |
|---|---|
| *C22B 11/06* | (2006.01) |
| *C22B 9/00* | (2006.01) |
| *C22B 4/00* | (2006.01) |
| *B22F 9/28* | (2006.01) |
| *B22F 9/12* | (2006.01) |
| *C01B 9/02* | (2006.01) |
| *C22B 4/08* | (2006.01) |
| *C01G 7/00* | (2006.01) |

(52) U.S. Cl.
CPC .............. *C22B 11/06* (2013.01); *B22F 9/12* (2013.01); *B22F 9/28* (2013.01); *C01B 9/02* (2013.01); *C01G 7/00* (2013.01); *C22B 4/005* (2013.01); *C22B 4/08* (2013.01); *C22B 9/006* (2013.01)

(58) Field of Classification Search
CPC .. C22B 4/005; C22B 4/08; C22B 5/16; C22B 11/06; B22F 9/28; B22F 9/12; C01G 7/00; C01B 9/02
See application file for complete search history.

(56) References Cited

U.S. PATENT DOCUMENTS

| | | | | |
|---|---|---|---|---|
| 1,262,452 A | * | 4/1918 | Clawson | C22B 1/08 423/44 |
| 2,985,507 A | * | 5/1961 | Wienert | C01G 1/06 423/60 |

(Continued)

FOREIGN PATENT DOCUMENTS

| | | |
|---|---|---|
| EA | 004480 B1 | 4/2004 |
| EA | 200300020 A1 | 4/2004 |

(Continued)

OTHER PUBLICATIONS

FR 2555082 machine translation (Year: 1985).*

(Continued)

*Primary Examiner* — Tima M. McGuthry-Banks
(74) *Attorney, Agent, or Firm* — IRL Legal Services, LLC; Ilya R. Lapshin

(57) ABSTRACT

A method and plant for gold recovery from any gold-bearing ore by low-temperature chlorination, wherein the finely-divided gold-bearing feedstock is chlorinated gaseous chlorine at a temperature of about 245° C. to form a highly volatile chloride compound, which after leaving a reactor is directed to a low-temperature nitrogen plasma unit having a temperature of 900-1100° C., wherein the said compound decomposes and turns into high-purity gold powder, which is cooled with gaseous nitrogen at a cooling reactor's inlet, which is equipped with a water chamber, and collected in a dumping hopper. Some embodiments allow recovery of high-purity 999.9 fine gold using an environmentally friendly, cost effective and inexpensive method implemented on an industrial scale.

18 Claims, 1 Drawing Sheet

(56) References Cited

U.S. PATENT DOCUMENTS

| | | | | |
|---|---|---|---|---|
| 3,825,651 | A * | 7/1974 | Fischer | C01G 7/00 423/44 |
| 4,146,388 | A | 3/1979 | Lafferty et al. | |
| 4,526,611 | A * | 7/1985 | Yoshizawa | H01F 1/065 75/347 |
| 6,379,419 | B1 * | 4/2002 | Celik | B01J 12/002 75/10.19 |
| 9,322,081 | B2 * | 4/2016 | McHugh | B22F 9/28 |
| 2005/0217428 | A1 * | 10/2005 | Kagohashi | B22F 9/28 75/367 |
| 2008/0118422 | A1 | 5/2008 | Amelunxen et al. | |
| 2019/0076931 | A1 * | 3/2019 | Oda | B22F 9/28 |

FOREIGN PATENT DOCUMENTS

| | | | | |
|---|---|---|---|---|
| EA | 201201076 | A1 | 12/2013 | |
| EP | 0788460 | A1 | 8/1997 | |
| EP | 1857205 | A1 | 11/2007 | |
| FR | 2555082 | A1 * | 5/1985 | ............... B22F 9/12 |
| JP | 2016/191117 | A | 11/2016 | |
| RU | 2002839 | C1 | 11/1993 | |
| RU | 2120487 | C1 | 10/1998 | |
| RU | 2181780 | C2 | 4/2004 | |
| RU | 2252817 | C1 | 5/2005 | |
| RU | 2489231 | C1 | 8/2013 | |
| RU | 2493280 | C1 | 9/2013 | |
| SU | 186687 | A1 | 11/1966 | |
| SU | 770220 | A1 | 7/1999 | |

OTHER PUBLICATIONS

Zyrjanov et al., Khloridnaya metallurgiya zolota, 1997, pp. 113 and 116, SP internet inzhiniring, Moscow, Russia.

International Search Report and Written Opinion dated Dec. 5, 2019, by ISA/RU for PCT/IB2019/057060.

* cited by examiner

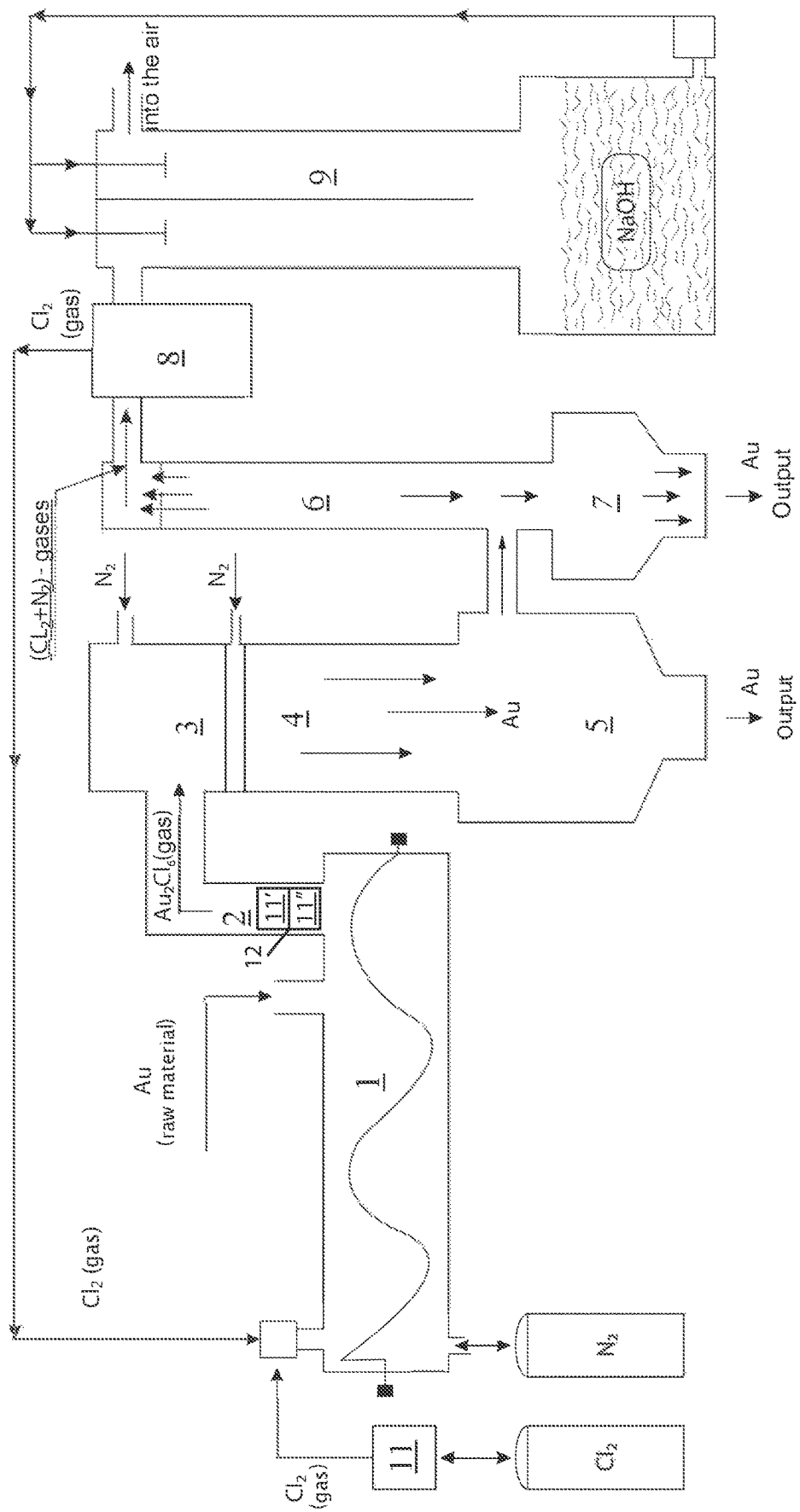

METHOD AND APPARATUS FOR EXTRACTING HIGH-PURITY GOLD FROM ORE

FIELD OF THE INVENTION

The invention pertains to the metallurgy, namely to the recovery and purification of gold-bearing compounds by a gas-phase method.

BACKGROUND

Pure gold (Au) is a soft yellow high-plasticity metal that can be forged in 0.1 μm (100 nm) thick forms and stretched out in a wire with linear density up to 2.0 mg/m.

Gold melting temperature reaches 1064.18° C. (1337.33K), boiling point–T (temperature)=2856° C. (3129K).

Density of liquid gold is less than that of solid gold and is equal to 17 g/cm$^3$ at the melting temperature.

Liquid gold is quite volatile, it actively vapors out long before the boiling point is reached.

Gold is a very heavy metal, density of pure gold is equal to 19.32 g/cm$^3$

Gold is one of the most inert metals, under normal conditions it does not interact with majority of acids and does not form oxides, that is why gold is a precious metal.

Current world reserves of gold are distributed as follows:

about 10% is used for industrial products, the rest is distributed approximately in equal parts between centralized reserves (mainly in the form of chemically pure gold bars) and individuals in the form of gold bars and jewelry.

Gold is inferior to majority of platinoids by its chemical resistance and mechanical reliability. However, gold is irreplaceable as a material for electrical contacts.

Therefore, gold conductors and electroplated gold coating of contact surfaces, connectors, printed boards are widely used in microelectronics.

Gold is used as a target in atomic researches and as coating for mirrors operating in far infrared band.

Gold is also widely used in dentistry, pharmacology and registered as a food supplement E175.

Therefore, there was high demand for gold at all times.

However, there is a significant problem associated not only with the recovery of high-purity gold, but also with the recovery of gold from the gold-bearing ore as all gold fields differ from each other by their chemical composition and impurities. Therefore, almost each gold field requires individual technology to process the gold-bearing ore.

The existing pure gold recovery technologies are mainly associated with the dissolution of the gold-bearing ore in various acids and its further recovery from gold solutions, for instance, gold dissolution in aqua regia, i.e. a mixture of nitric and hydrochloric acids.

However, these methods do not enable recovery of high-purity 999.9 fine gold.

The 999.9 fine gold corresponds to a gold chemical purity of 99.99%.

Gold may also be recovered by a chlorination method.

All processes of gold recovery from the gold-bearing ore by the chlorination method described in patents are practically identical, for instance, the Soviet patent SU770220 A1, published on Jul. 10, 1999, "A Method of Processing a Precious Metal-Bearing Material by Chlorination", suggesting passing through gaseous chlorine in molten alkali-metal chlorides at T=620-750° C. In order to accelerate the process rate and increase the chlorination degree, the base material is immersed to the depth of 0.1-3 mm prior to chlorination, and gaseous chlorine is supplied between two phases "base material-molten material", with further removal of resulted chlorides of precious metals by shaking and stirring of the molten material.

Disadvantage of this method is that many impurities, such as iron, molybdenum, tungsten, vanadium, etc., are chlorinated at T=620-750° C. as well that leads to the contamination of chlorides of precious metals, and such impurities are difficult to remove in future processes.

There is a method of gold chlorination in a molten mass at T=1423K, (Russian patent RU 2181780 C2 published on Apr. 27, 2002), which suggest supplying gaseous chlorine through graphite pipes in the preliminary melted material at T=1423K.

In such a way, the resulted chlorides of impurity metals (iron, zinc, lead, etc.) are distilled off and trapped in electrostatic condensers.

Upon the distillation of the main mass of impurities, cupric and iron chlorides are removed from the molten mass, and recovered gold is poured in casting molds, thus producing commercial bars with gold content of at least 99.5% and silver—0.35%.

Disadvantages of this method are high energy consumption, complexity of equipment used due to high temperatures required for chlorine operations and strict requirements to environmental safety.

In addition, it is impossible to recover high purity gold (999.9 fine).

All these methods are highly expensive and environmentally unsustainable, they require multiple operations to purify impurities that causes many problems in such industries.

Therefore, there is the need to develop new cost effective, environmentally friendly and safe technologies.

BRIEF SUMMARY

In order to solve the problem, a highly selective method of extracting precious metals, namely gold, which is recovered from the gold-bearing ore, is proposed without affecting other components (impurities).

We have developed a new technology to recover pure gold (999.9 fine) in one process, not requiring large production areas and high energy consumption. The technology doesn't produce harmful emissions, it is environmentally friendly, its production cost of high-purity gold (999.9 fine) is many times lower than the cost of standard refining methods.

This became possible due a combination of low-temperature chlorination and low-temperature plasma technologies that were not previously studied, not described and not used neither in theory nor in practice.

In particular, it is proposed to use a method of recovering high-purity gold from any gold-bearing ore by chlorination at low temperatures, where finely dispersed gold-bearing feedstock is chlorinated at a temperature not greater than 245° C.

In this case, the chlorination process involves gaseous chlorine to form a highly volatile chloride compound of $Au_2Cl_6$, which is sublimated at this temperature and exits the chlorination reactor.

After the reactor, the sublimate comprising chlorides of gold, iron and other impurities is directed to the gas duct equipped with consecutive filters to purify this mixture from gold impurities, filled with reagents. Free of any impurities gaseous sublimate of aurous chloride dimer ($Au_2Cl_6$) enters the low-temperature nitrogen plasma unit having a temperature of 900-1100° C., where the said compound decomposes to finely-divided gold metal powder, which is cooled and collected in a dumping hopper.

The particle size of the gold-bearing ore being charged can make up 30-50 μm.

The reactor and the gas duct are treated with an inert gas (argon or nitrogen) to remove air before chlorination.

The gold-bearing ore is loaded into the chlorination reactor through a screw in countercurrent to chlorine.

Prior to be directed into the plasma unit, the sublimate is filtrated through a granular material to remove related substances.

Finest particles not settled in the hopper may be trapped in additional filtration sleeves with subsidence in additional dumping hoppers.

After leaving the plasma unit, excessive and precipitated chlorine is purified of nitrogen and directed to the reactor for reuse.

A scrubber located at a terminal part of the unit is used in conjunction with alkaline solution for the neutralization of possible chlorine in case of emergency.

In another aspect some embodiments pertain to the low-temperature chlorination plant for gold recovery from gold-bearing ore by the method described above. This plant includes the following components:

a reactor for low-temperature chlorination of gold-bearing ore, designed to maintain a temperature not greater than 245° C. and equipped with special means for uniform supply of gaseous chlorine and crushed gold-bearing ore to the reactor;

a low-temperature nitrogen plasma unit with a temperature of 900-1100° C. for the decomposition of aurous chloride dimer;

a hopper to collect gold powder generated in the plasma unit;

a chlorine regeneration assembly for the purification from related gaseous impurities, which outlet is connected with the inlet of the chlorination reactor;

Optionally the plant may be equipped with a filtration system 12 for separation of impurities, which is located between the reactor 1 and the plasma unit 3.

The filtration system may represent a series of filters 11', 11" comprising granular reagents consequently installed in a gas duct and designed specifically for trapping each impurity.

The scrubber is provided for at a terminal part of the plant for the alkaline neutralization of possible chlorine in case of emergency.

The plant may have a system of temperature sensors and pressure sensors, raw material and reagent feed sensors, finished product discharge sensors for an automated control of the process.

A special unit to heat supplied chlorine up to 50° C.–70° C. may be optionally installed before the reactor's inlet.

Some embodiments enable recovery of high-purity powder of 999.9 fine gold using a cost effective and environmentally friendly method due to the exclusion of labor consuming, material-intensive and energy consuming stages and the recirculation of used chlorine.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWING

The drawing is not necessarily to scale; emphasis has instead been placed upon illustrating the principles of the invention. The FIGURE presents the workflow of the plant, which is one embodiment of the invention.

DETAILED DESCRIPTION

One plant embodiment schematically illustrated in the FIGURE operates based on the low-temperature chlorination technology (LTC) and designed for the recovery of high-purity aurous chloride dimers ($Au_2Cl_6$) from any gold-bearing ores, which form a basis for the recovery of high-purity gold powders, while the plant's capacity makes up 6.0 tons per annum under single-shift work conditions.

The whole process runs in a gas environment at a temperature of approximately 245° C. in a closed cycle with no harmful emissions into the atmosphere as all used chlorine is recycled, therefore the whole process is completely environmentally friendly.

The plant comprises the following assemblies.

The continuously operating LTC reactor, which handles chlorination of gold-bearing ore by gaseous chlorine.

A specific nature of chlorination reactions at low temperatures in comparison with standard reactions (over 1000° C.) poses certain requirements to the design of the reactor and its operational mode.

The reactor 1 is a cylindrical horizontally mounted chamber made of fused silica, resistant to such aggressive medium as chlorine at operational temperatures.

The feedstock is supplied continuously by portions through a feed-control device, which automatically supplies a set amount of the feedstock to the reactor from a loading hopper, depending on the desired output.

A carbon fiber plastic screw rotates in the reactor and mixes the supplied gold-bearing ore to evenly heat powders, pass gaseous chlorine and avoid agglomeration of powders.

The system is preliminary blown down by argon or nitrogen at a rate of 100 l/min for air removal from the system, and all plant assemblies are simultaneously heated up to 245° C.

The heating is provided by panel folding heaters equipped with embedded heating elements made of heat-resistant materials.

Design of the panel folding heaters allows replacing heating elements without a need to dismantle the reactor's housing.

Gaseous chlorine is supplied to the reactor 1 from a liquid chlorine bulb after passing through a heater 11 with a capacity of 50 l, where chlorine is heated to the temperature required for chlorination (approximately 60° C.).

Gaseous chlorine is supplied in excess, approximately 4-5 times higher than stoichiometry, at a rate of 40 l/min for the most complete chlorination process.

The chlorination process is carried out between gaseous reagents and solid raw materials; therefore, its effectiveness depends on the contact area between these phases, i.e. on the fineness degree of the raw material.

The feedstock must be finely divided with a particle size of 30-50 μm to ensure effectiveness of the process. The fine-dispersed raw material is fed into the reactor in countercurrent to chlorine.

As a result, chlorination of gold-bearing ore takes place in the reactor 1. A temperature not exceeding 245° C. is required for the reaction. In this case the reaction changes gold only to $Au_2Cl_6$:

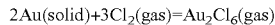

$$2Au(solid)+3Cl_2(gas)=Au_2Cl_6(gas)$$

This is an exothermic reaction, taking place with minor heat release.

Given the specified temperatures, $Au_2Cl_6$ vapors having a sublimation temperature of 245° C. are mainly sublimated.

It should be pointed out that some other elements, such as iron, vanadium, etc. presented in the gold-bearing ore are also sublimated along with aurous chloride vapors.

Such components of gold-bearing ore, as silver, nonferrous metals, silicon, etc. do not react at process temperatures and remain in the charge.

The chlorination process is characterized by the following parameters:

operating flow rate of feedstock, in gold equivalent—3.0 kg/h;
feedstock fineness: 30-50 μm;
aurous chloride dimer recovery rate ($Au_2Cl_6$)—4.65 kg/h;
product fineness: 1-15 μm; and
system pressure: 15-20 mm Hg.

Further, the obtained chlorination product ($Au_2Cl_6$) is sublimated and enters the gas duct 2 made of fused silica, where the gas mixture is purified from contaminating impurities with the sublimate going through filters 11' 11" filled with granules of the corresponding reagents.

Every filter 11' 11" is a fused silica cylinder having one side open and a mesh bottom on the other side. The preferred configuration of the system has 3 filters sequentially arranged in the gas duct vertically one above the other.

Granulated salt (NaCl) is used to purify the gas mixture from iron impurities and other components. NaCl turns into a non-volatile compound and settles on salt granules when reacting with iron chloride vapors.

Fine copper chips are used to purify the mixture from vanadium impurities. When reacting with the chips, vanadium chloride vapors also turn into a non-volatile compound and settle on the copper chips.

A granular zeolite (for example, erionite) is used for final purification of impurities, which purifies gaseous aurous chloride dimer from mechanical impurities and moisture.

Reagents in the filters should be replaced in the course of production, depending on the amount of impurities contained in the feedstock. On average, the replacement takes place once every 7 days of plant operation.

After passing through the filtration system 12, the gaseous $Au_2Cl_6$ purified of all impurities flows through the gas duct 2 to the low-temperature arc plasma unit 3, where $Au_2Cl_6$ decomposes in the low-temperature nitrogen plasma (900-1100° C.) and turns into high-purity gold powder.

The type of the powder depends on the temperature, mode and residence time the gas flow in the plasma unit.

The decomposition process using the low-temperature plasma is characterized by the following parameters:

high-purity gold powder recovery rate: 3.0 kg/h;
fineness of gold powder: 1-10 μm (depending on the task, the fineness is regulated in the low-temperature plasma unit by adjusting the residence time of particles in the cooling reactor and the plasma temperature); and
system pressure: 1 atm or 760 mm Hg.

The obtained high-purity gold powders are cooled in the reactor 4, which is cooled by cold running water circulating through a cooling circuit.

Then, the powder settles in the receiving hopper 5, while smaller unsettled particles are removed with the gas stream and trapped in the filtration sleeves 6 made of heat-resistant material and the cyclone filters 7.

Fineness of the gold powder is regulated by the residence time in the cooling reactor, which is usually a hundredth of a second.

The main high-purity gold powder settles under the action of a centrifugal force initiated by a stream of purified air.

The waste gas mixture containing chlorine derived from the decomposition of aurous chloride dimer, as well as nitrogen, enters the chlorine regeneration assembly 8, where gaseous chlorine is separated from nitrogen and reused in the reactor 1.

For safety purposes, the fiberglass scrubber 9 containing a solution of NaOH to neutralize chlorine is also provided at the outlet to catch chlorine, which may be released in emergencies or as a result of a breakthrough.

The plant enables recovery of high-purity aurous chloride dimers of 999.9 fine that are further used to produce high-purity 999.9 fine gold powders by means of the low-temperature plasma.

The proposed method makes it possible to use core process equipment (chlorination reactor, sublimation filters, gas ducts, finished product condensers) made of fused silica or heat-resistant glass to realize the process.

Power consumption of the complete set of equipment makes up a maximum of 125 kW/h.

The complete set of equipment requires the area of about 10 $m^2$ and the production shop—100 $m^2$ at most given a ceiling height of 3.5 m.

Moreover, the plant does not require to be connected to the acid drainage system and does not emit harmful substances into the atmosphere as it operates based on a fully closed cycle.

A set of equipment arranged in one embodiment enables production of high-purity 999.9 fine gold powders with a capacity of 6.0 tons per annum given an 8-hour working day, which is an unprecedented result having no analogues in the world.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of extracting gold from gold-bearing material, comprising:
    chlorination of the gold-bearing material using gaseous chlorine at a temperature not greater than 245° C. to form a volatile chloride compound in a reactor; and
    decomposing the volatile chloride compound in a low-temperature nitrogen plasma unit having a temperature between 900° C. and 1100° C. to produce high-purity gold powder.

2. The method of claim 1, wherein the particle size of the gold-bearing material is 30-50 μm.

3. The method of claim 1, wherein the reactor is blown down with an inert gas to remove air prior to the chlorination.

4. The method of claim 1, wherein the gold-bearing material is fed into the reactor through a screw in countercurrent to gaseous chlorine.

5. The method of claim 1, further comprising filtering the volatile chloride compound through a granular material to remove impurities before the decomposing in the plasma unit.

6. The method of claim 1, further comprising trapping particles of the gold powder in filtration sleeves.

7. The method of claim 1, wherein the reactor is not the plasma unit.

8. A method of extracting gold from gold-bearing material, comprising:
   chlorination of the gold-bearing material using gaseous chlorine at a temperature not greater than 245° C. to form a volatile chloride compound in a reactor; and
   decomposing the volatile chloride compound in a low-temperature nitrogen plasma unit having a temperature between 900° C. and 1100° C. to produce high-purity gold powder
   and further comprising:
      removing nitrogen from chlorine exiting the plasma unit; and
      transferring the chlorine to the reactor for reuse,
   or further comprising:
      generating chlorine leaks; and
      neutralizing the chlorine leaks with alkali in a scrubber.

9. An apparatus for the method of claim 1, comprising:
   a reactor for low-temperature chlorination of gold-bearing material capable of maintaining a temperature not greater than 245° C.;
   a low-temperature nitrogen plasma unit capable of operating at a temperature between 900° C. and 1100° C. for decomposition of volatile chlorinated gold compound generated in the reactor; and
   a source of nitrogen connected to the low-temperature nitrogen plasma unit.

10. The apparatus of claim 9, further comprising a filtration system between the reactor and the plasma unit for removal of impurities from the chlorinated gold compound.

11. The apparatus of claim 9, further comprising a hopper to collect the gold powder produced in the plasma unit.

12. The apparatus of claim 9, wherein the volatile chloride compound is $Au_2Cl_6$.

13. The apparatus of claim 9, wherein the reactor is not the plasma unit.

14. An apparatus for the method of claim 1, comprising:
   a reactor for low-temperature chlorination of gold-bearing material capable of maintaining a temperature not greater than 245° C.;
   a low-temperature nitrogen plasma unit capable of operating at a temperature between 900° C. and 1100° C. for decomposition of volatile chlorinated gold compound generated in the reactor; and
   a filtration system between the reactor and the plasma unit for removal of impurities from the chlorinated gold compound,
   wherein the filtration system comprises at least one filter comprising granular reagents installed in a gas duct and designed specifically for trapping each impurity.

15. An apparatus for the method of claim 1, comprising:
   a reactor for low-temperature chlorination of gold-bearing material capable of maintaining a temperature not greater than 245° C.;
   a low-temperature nitrogen plasma unit capable of operating at a temperature between 900° C. and 1100° C. for decomposition of chlorinated gold compound generated in the reactor;
   a chlorine regenerator for separating gaseous chlorine from gaseous impurities for subsequent use in the chlorination reactor; and
   a scrubber connected to the chlorine regenerator for alkaline neutralization of chlorine leaks.

16. An apparatus for the method of claim 1, comprising:
   a reactor for low-temperature chlorination of gold-bearing material capable of maintaining a temperature not greater than 245° C.;
   a low-temperature nitrogen plasma unit capable of operating at a temperature between 900° C. and 1100° C. for decomposition of volatile chlorinated gold compound generated in the reactor; and
   a heater for heating gaseous chlorine up to between 50° C. and 70° C. before the gaseous chlorine enters the reactor.

17. An apparatus for the method of claim 1, comprising:
   a reactor for low-temperature chlorination of gold-bearing material capable of maintaining a temperature not greater than 245° C.;
   a low-temperature nitrogen plasma unit capable of operating at a temperature between 900° C. and 1100° C. for decomposition of chlorinated gold compound generated in the reactor;
   a chlorine regenerator for separating gaseous chlorine from gaseous impurities for subsequent use in the chlorination reactor; and
   a source of nitrogen connected to the low-temperature nitrogen plasma unit.

18. The method of claim 1, wherein the volatile chloride compound is $Au_2Cl_6$.

* * * * *